US 12,138,878 B1

(12) United States Patent
Smith (10) Patent No.: US 12,138,878 B1
(45) Date of Patent: Nov. 12, 2024

(54) BEAD CLAMP RING

(71) Applicant: BRIDGESTONE AMERICAS TIRE OPERATIONS, LLC, Nashville, TN (US)

(72) Inventor: Jason B. Smith, Fairview, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/691,087

(22) PCT Filed: Aug. 30, 2022

(86) PCT No.: PCT/US2022/075634
§ 371 (c)(1),
(2) Date: Mar. 12, 2024

(87) PCT Pub. No.: WO2023/076759
PCT Pub. Date: May 4, 2023

Related U.S. Application Data

(60) Provisional application No. 63/271,853, filed on Oct. 26, 2021.

(51) Int. Cl.
*B29D 30/32* (2006.01)
(52) U.S. Cl.
CPC ...... *B29D 30/32* (2013.01); *B29D 2030/3214* (2013.01)
(58) Field of Classification Search
CPC .................. B29D 30/30; B29D 2030/3214
See application file for complete search history.

(56) References Cited

U.S. PATENT DOCUMENTS

| 6,012,500 A | 1/2000 | Connor |
| 6,837,292 B2 | 1/2005 | De Graaf et al. |
| 7,101,451 B2 | 9/2006 | Zemla et al. |
| 2003/0034132 A1 | 2/2003 | De Graaf et al. |
| 2008/0264570 A1 | 10/2008 | Slots et al. |

FOREIGN PATENT DOCUMENTS

| EP | 2293927 B1 | 11/2012 |
| KR | 101183193 B1 | 9/2012 |

OTHER PUBLICATIONS

International Search Report and Written Opinion for corresponding patent application No. PCT/US2022/075634, dated Dec. 15, 2022, 9 pages (not prior art).

*Primary Examiner* — Jacob T Minskey
*Assistant Examiner* — Adrien J Bernard
(74) *Attorney, Agent, or Firm* — Shaun J. Fox; Wayne Beavers (57) ABSTRACT

The present disclosure relates to a bead clamp ring for covering a bead clamp of a tire building machine during a tire building process, comprising an annular body formed of a flexible material that includes a central body portion, a proximal end body portion, and a distal end body portion. The proximal end body portion includes a securing to secure the bead clamp ring to the drum. The distal end body portion includes a bead lug to engage the bead clamp. The bead lug includes an annular recess, which includes a proximal recess portion communicated with the open recess end and an enlarged distal recess portion defining the closed recess end. The enlarged distal recess portion extends radially below the proximal recess portion and has a greater radial depth than the proximal recess portion. The enlarged distal recess portion is located distally of a mid-point of the bead lug length.

20 Claims, 8 Drawing Sheets

BEAD CLAMP RING

BACKGROUND

The present disclosure relates generally to a tire building machine including a drum, a bead clamp, and a bead clamp ring.

A tire building machine utilizing a tire building drum and bead clamps are generally known. The tire building machine operates by allowing a tire carcass to surround the drum and bead clamps. Tire beads are then placed over the bead clamp, the tire carcass is inflated between the two tire beads, and the carcass is shaped using two sets of turn-up arms attached to the tire building drum of the tire building machine. An exemplary process is described in U.S. Pat. No. 6,837,292.

Prior systems have also incorporated one or more bead clamp rings that attach to the drum and the bead clamps. As the bead clamps move radially with respect to a central axis of the tire building drum, the bead clamp rings protect the tire carcass from the mechanical components of the drum and bead clamps. In these systems, the tire bead is placed on the portion of the bead clamp ring inserted into the bead clamp. The tire bead is secured such that it forms an airtight seal with the bead clamp ring, and the bead clamp is able to move radially to more securely seal the tire carcass and hold the tire carcass in place during the tire forming process. To improve the seal created between the tire bead and the bead clamp ring, it is generally desirable to tighten the tire bead as much as possible, placing a high pressure on the bead clamp ring.

Figure 4:
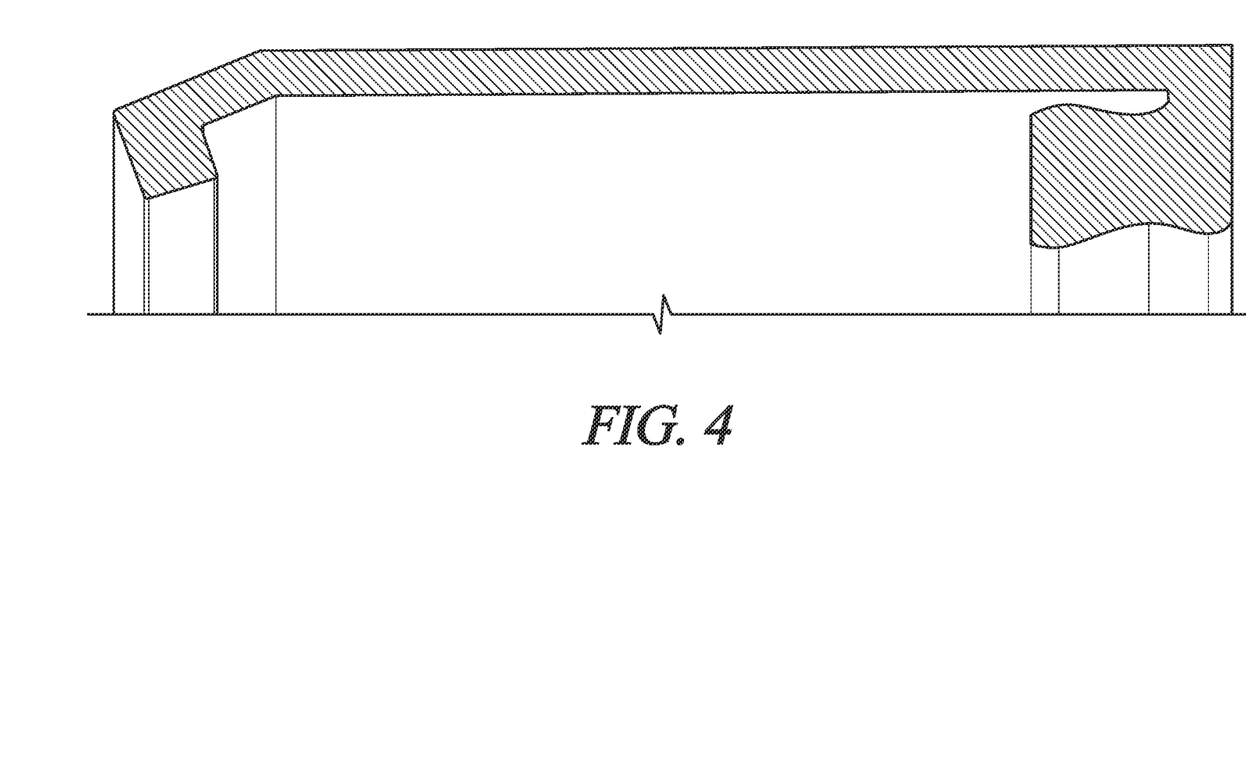
FIG. 4 illustrates a cross sectional view of a prior art bead clamp ring.

Prior art bead clamp rings, such as those shown in FIG. 4, include a bead lug for receiving the tire bead as described and for securing the bead clamp ring to the bead clamp. The bead lug shown in FIG. 4 includes a recess and a hinge column connecting the bead lug to the annular body. Under pressure from the tire bead, the hinge column bends such that the annular body and the bead lug are pressed together. The point where the recess begins at the hinge column is a common point of failure for the bead clamp ring due to the high pressure exerted by the tire bead.

What is needed, therefore, is an improved bead clamp ring that better distributes the stress caused by the tire bead such that the life of the bead clamp ring is extended. The present disclosure describes such an improved bead clamp ring by providing a new geometry of the cross section of the bead clamp ring for better distributing the stress applied to the bead clamp ring.

BRIEF SUMMARY

Briefly, the present disclosure relates, in one aspect of the disclosure, to a bead clamp ring for covering a bead clamp of a tire building machine during a tire building process, comprising an annular body formed of a flexible material that includes a central body portion, a proximal end body portion, and a distal end body portion. A central axis also passes through the middle of the annular body, which defines a longitudinal direction and a radial direction. The longitudinal direction extends parallel to the central axis and the radial direction extends perpendicular from the central axis. The proximal end body portion includes a securing lug defined integrally on the proximal end body portion and being configured to secure the bead clamp ring to the drum. The distal end body portion includes a bead lug defined integrally on the distal end body portion and configured to engage the bead clamp. The bead lug extends radially inward relative to the central body portion and has a bead lug length defined in the longitudinal direction between a bead lug proximal end and a bead lug distal end. The bead lug includes an annular longitudinally extending recess defined in the bead lug, which extends distally from an open recess end formed in the bead lug proximal end to a closed recess end. The recess includes a proximal recess portion communicated with the open recess end and an enlarged distal recess portion defining the closed recess end. The proximal recess portion has a proximal recess portion radial depth defined between a proximal recess portion radially outer recess wall and a proximal recess portion radially inner recess wall. The enlarged distal recess portion extends radially inward below the proximal recess portion radially inner recess wall and has a greater radial depth than the proximal recess portion radial depth. The enlarged distal recess portion is located entirely distally of a mid-point of the bead lug length.

In other embodiments, the recess has a recess length from the open recess end to the closed recess end equal to at least 70%, 80%, or 90% of the bead lug length.

In another embodiment, a cross-sectional view along a radial plane parallel to the central axis includes the proximal recess portion radially outer recess wall being substantially straight and parallel to the central axis and the cross section of the enlarged distal recess portion is partially circular and extends radially inward below the proximal recess portion radially inner recess wall. In other embodiments, the partially circular cross-section of the enlarged distal recess portion has a diameter at least 1.5 or at least 2.0 times the proximal recess portion radial depth immediately adjacent the enlarged distal recess portion. In another embodiment, the central body portion of the annular body is substantially cylindrically tubular in shape having a cylindrical outer tubular surface and a cylindrical inner tubular surface, and the proximal recess portion radially outer recess wall is an unbroken extension of the cylindrical inner surface. In another embodiment, the central body portion of the annular body has a tubular wall thickness defined radially between the cylindrical outer tubular surface and the cylindrical inner tubular surface. In the cross-sectional view along the radial plane parallel to the central axis the bead lug includes a hinge column defined longitudinally between the closed recess end and the distal end of the bead lug. The hinge column has a hinge column width defined longitudinally between the closed recess end and the distal end of the bead lug. The hinge column width is less than the tubular wall thickness. In another embodiment, the hinge column width is in the range of from about 50% to about 80% of the tubular wall thickness. In another embodiment, the hinge column is the most flexible part of the bead lug and defines a hinge point of the bead lug with reference to distortion of the bead lug occurring during operation of the tire building machine.

In another embodiment, a cross-sectional view along a radial plane parallel to the central axis the bead lug includes a radially innermost bead lug surface including a radially inner bead lug groove having a concave cross-sectional profile such that a radial thickness of the bead lug at a mid-point of the bead lug length is less than a radial thickness of the bead lug at both the bead lug proximal end and the bead lug distal end. In another embodiment, at the mid-point of the bead lug length, the bead lug has a radial solid material thickness equal to a first radial distance from the radially innermost bead lug surface to the proximal recess portion radially inner recess wall plus a second radial distance from the proximal recess portion radially outer recess wall to a radially outermost bead lug surface, the radial solid material thickness being in a range of from about 50% to about 90% of the radial thickness of the bead lug at the bead lug distal end. In another embodiment, at the mid-point of the bead lug length, the radially inner bead lug groove has a groove depth greater than the proximal recess portion radial depth.

In another embodiment, the tire building machine including the bead clamp ring further comprises the drum and the bead clamp. The bead clamp ring surrounds the drum with the bead lug received about the bead clamp.

In another aspect of the disclosure, a bead clamp ring for covering a bead clamp of a tire building machine during a tire building process comprises an annular body formed of a flexible material that includes a generally cylindrically tubular body portion, an annular securing lug, an annular hinge, and an annular bead lug. The generally cylindrically tubular body portion includes a central axis defining a longitudinal direction and a radial direction extending perpendicularly from the central axis. The annular securing lug is defined integrally on a proximal end of the generally cylindrically tubular body portion and is configured to secure the bead clamp ring to the drum. The annular hinge extends radially inward from a distal end of the generally cylindrically tubular body portion. The annular bead lug is located radially inward of the generally cylindrically tubular body portion and connected to the generally cylindrically tubular body portion by the annular hinge and has an annular bead lug length parallel to the central axis. In an unstressed state of the annular body an annular recess separates the generally cylindrically tubular body portion from the annular bead lug and extends from an open recess proximal end to a closed recess distal end adjacent the annular hinge. The recess has a mid-point recess radial width at a mid-point of the annular bead lug length and an enlarged recess portion adjacent the annular hinge. The enlarged recess portion has an enlarged recess portion radial width greater than the mid-point recess radial width.

In another embodiment, the annular recess has a recess length from the open recess proximal end to the closed recess distal end equal to at least 80% of the bead lug length.

In another embodiment, the cross-sectional view along a radial plane parallel to the central axis includes the enlarged recess portion that is partially circular in cross-section and has a diameter at least 1.5 times the mid-point recess radial width.

In another embodiment, the generally cylindrically tubular body portion has a tubular wall thickness and the annular hinge has a minimum hinge dimension parallel to the central axis and being less than the tubular wall thickness. In another embodiment, the minimum hinge dimension is in the range of from about 50% to about 80% of the tubular wall thickness.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

FIGS. 1A-1D schematically show tire building machine 100 including a longitudinal section of a tire building drum 102 for building a (radial) tire carcass 104, in several steps. Such a tire contains tire components of rubber—including for example, reinforcement cords, a liner having two sides, and a carcass layer—and two tire beads 106. The number and the type of tire components depend on the tire to be manufactured in the end, and the possible compositions and structure are known to a skilled artisan.

Tire building machines 100 that include a tire building drum 102 and a turn-up mechanism 108 are generally known. They may be designed as a tire building drum 102 on which the tire components, including the liner layer, carcass layer, and tire beads 106 are supplied, forming a cylindrical tire carcass 104. After forming the tire carcass 104 on the tire building drum 102, the tire carcass 104 is expanded into a curved torus shape, in which the sides of the tire carcass 104 are turned up about the tire beads 106 by the turn-up mechanism 108.

The tire building drum 102 is provided with a central shaft 110. Two annular bead clamps 112 are placed about the central shaft 110 and at a distance from each other, each bead clamp 112 is configured to support accompanying tire beads 106 and is provided with a bead clamp ring 114 that surrounds the tire building drum 102 and bead clamp 112. This bead clamp ring 114 prevents the tire carcass 104 from being pressed from the mechanical components of the of the tire building drum 102 and the bead clamp 112 during tire formation.

Figure 1A:
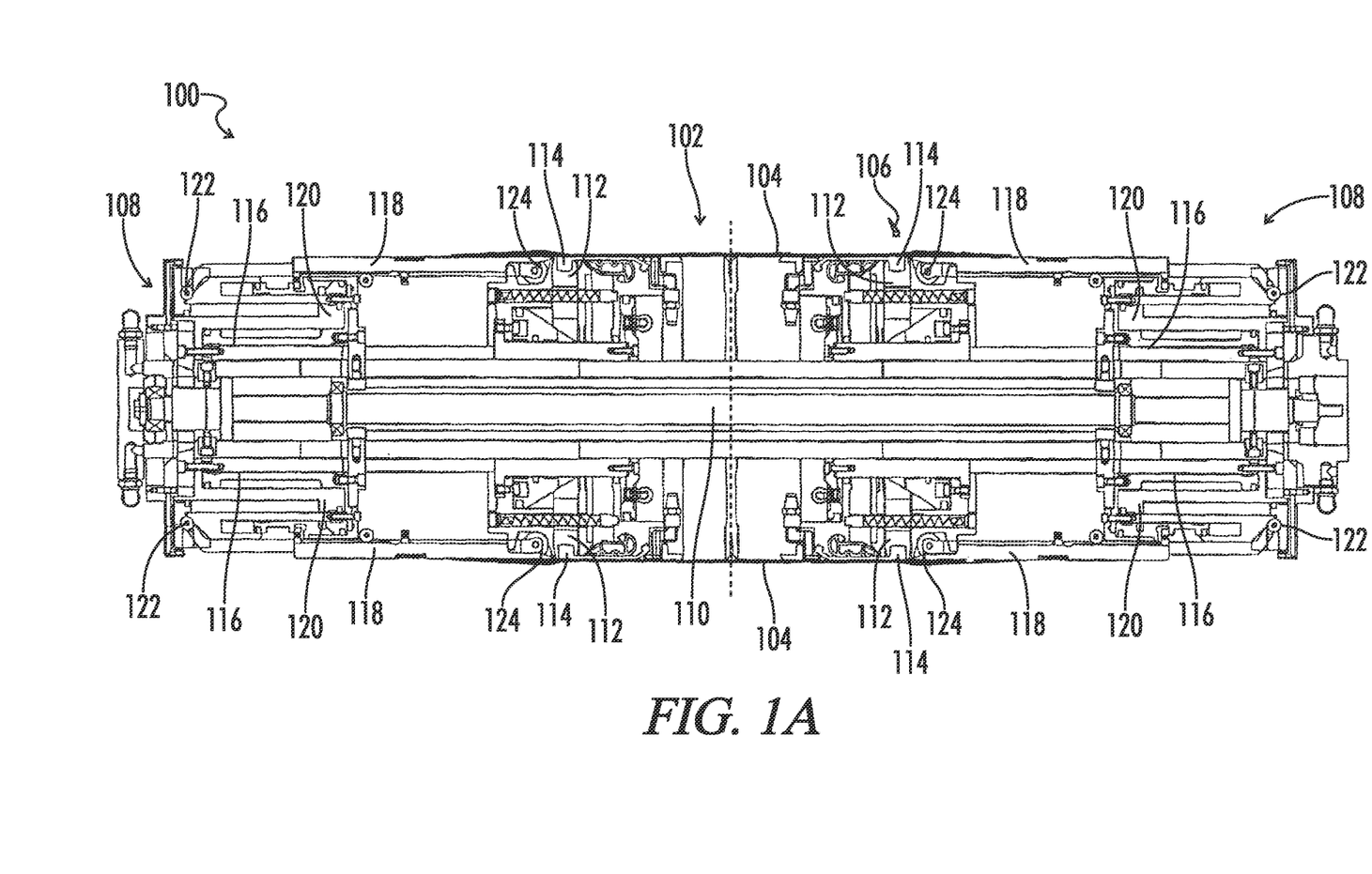
FIG. 1A illustrates a schematic view along a longitudinal section of a tire building drum for building a tire.
Figure 1B:
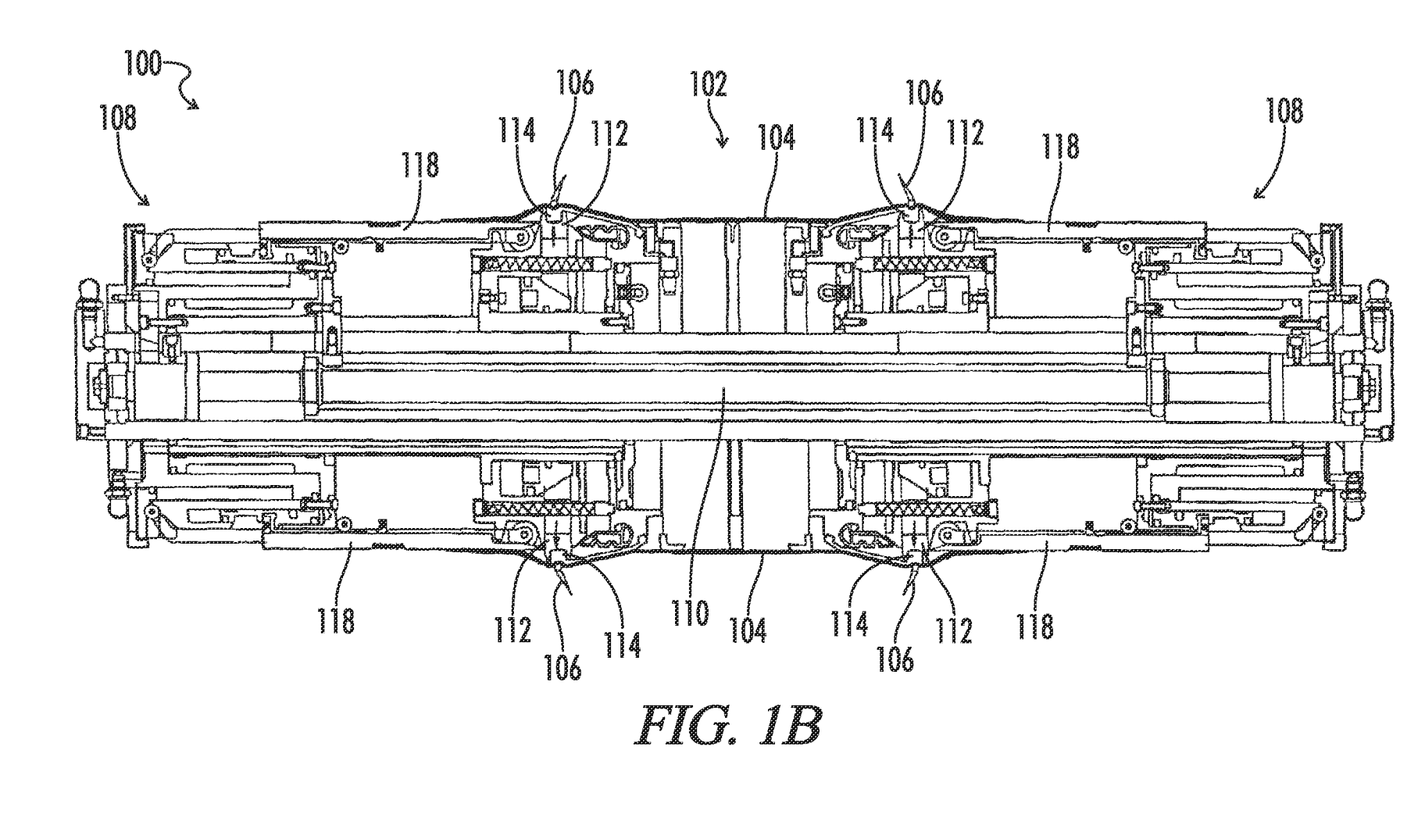
FIG. 1B illustrates a schematic view along a longitudinal section of the tire building drum of FIG. 1A at a second step of building the tire.
Figure 1C:
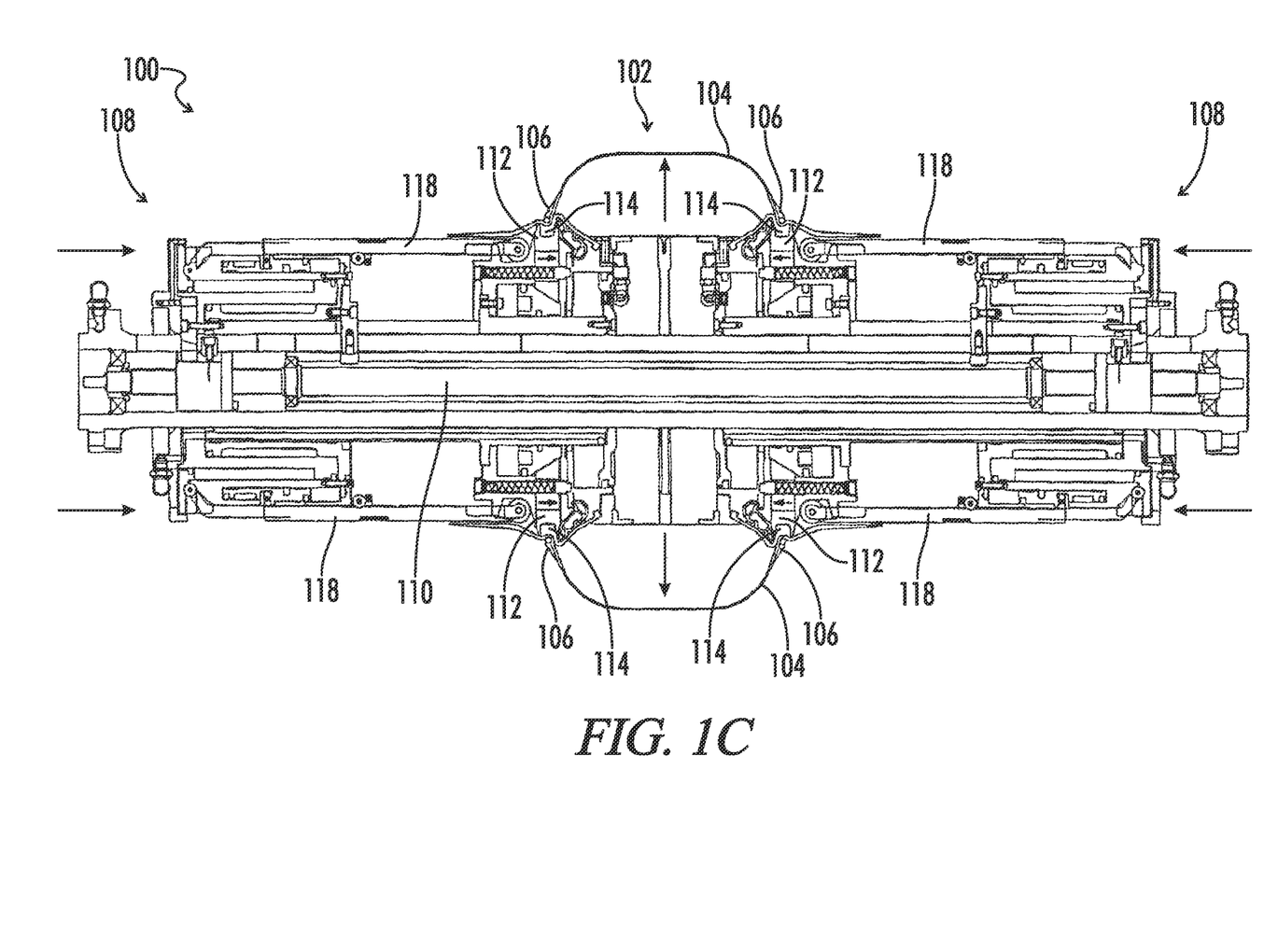
FIG. 1C illustrates a schematic view along a longitudinal section of the tire building drum of FIG. 1A at a third step of building the tire.
Figure 1D:
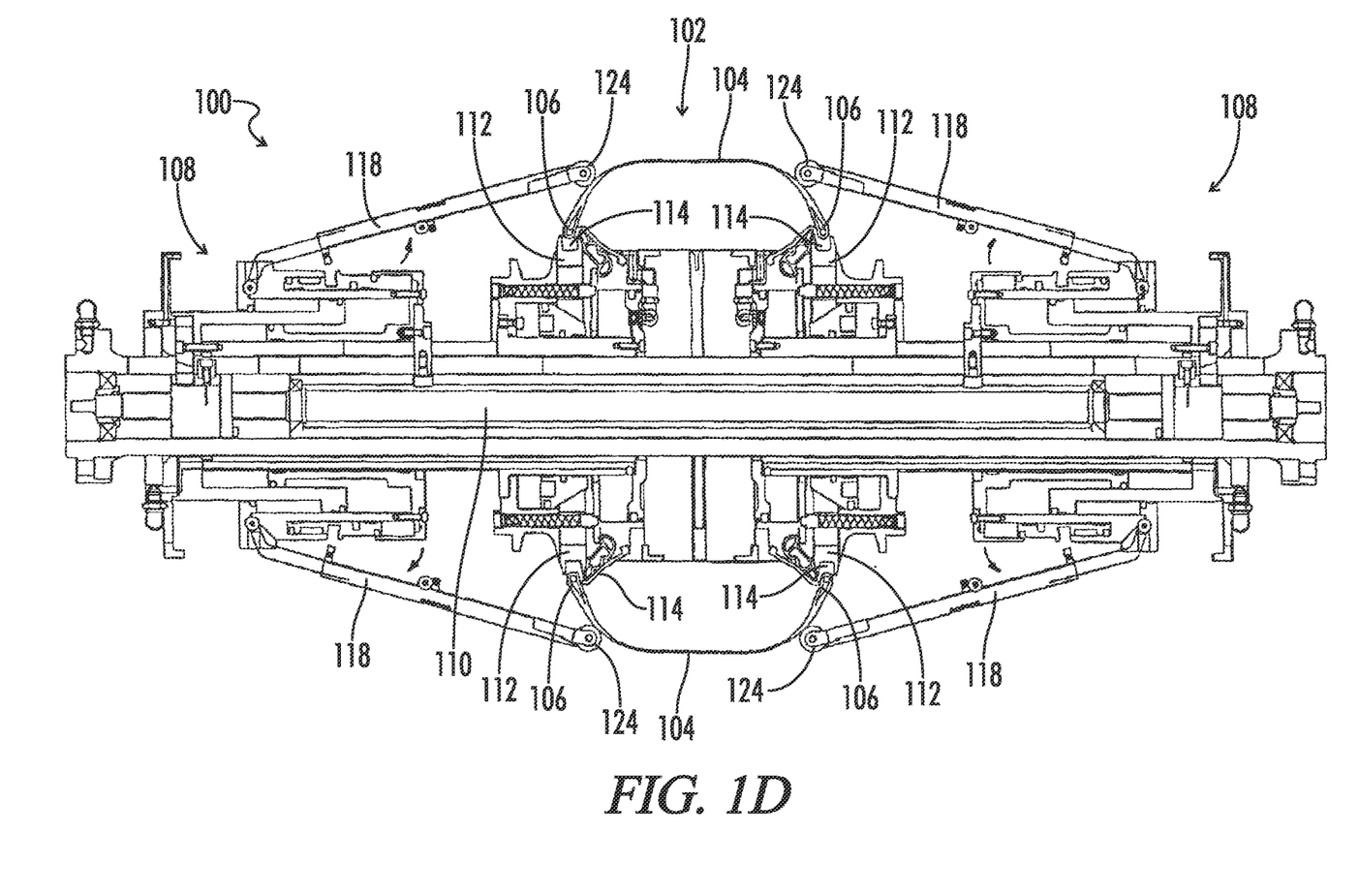
FIG. 1D illustrates a schematic view along a longitudinal section of the tire building drum of FIG. 1A at a fourth step of building the tire.

FIGS. 1A-1D show an example of a tire building drum 102. As is known, the tire building drum 102 may be configured to radially expand the portion of the tire carcass 104 situated between the bead clamps 112, such as by air pressure. Inflating the tire carcass 104 creates a torus shape. An example of the inflated tire carcass 104 is shown in FIGS. 1C and 1D.

Two annular cylinders 116 are arranged about both ends of the central shaft 110 and include turn-up arms 118. These turn-up arms 118 are controlled by the motion of cylinder 116 and pistons 120 at the hinge point 122 of the turn-up arm 118, as is known in the art.

FIG. 1D shows the turn-up arms 118 elongated. In this state, the turn-up arms 118 operate together with the roller 124 to turn up the portion of the tire carcass 104 located outside the bead clamps 112 against the expanded portion of tire carcass 104. The tire carcass 104 is then formed into a cylindrical tire casing. Subsequently the bead clamps 112 are radially expanded so that they extend radially. The bead clamps 112 are configured to clamp the tire material around the tire bead 106 to ensure an airtight clamping.

The bead clamp rings 114 help reduce the pressure against the tire carcass 104 from the mechanical components of the bead clamp and tire drum during tire formation and help the bead clamps 112 form an airtight seal with the tire beads 106. These bead clamp rings 114 are configured to move with the bead clamps 112 so that when the bead clamp 112 moves radially, the bead clamp 112 and bead clamp ring 114 more securely seal the tire carcass 104 and hold the tire carcass 104 in place during the tire forming process.

Figure 2:
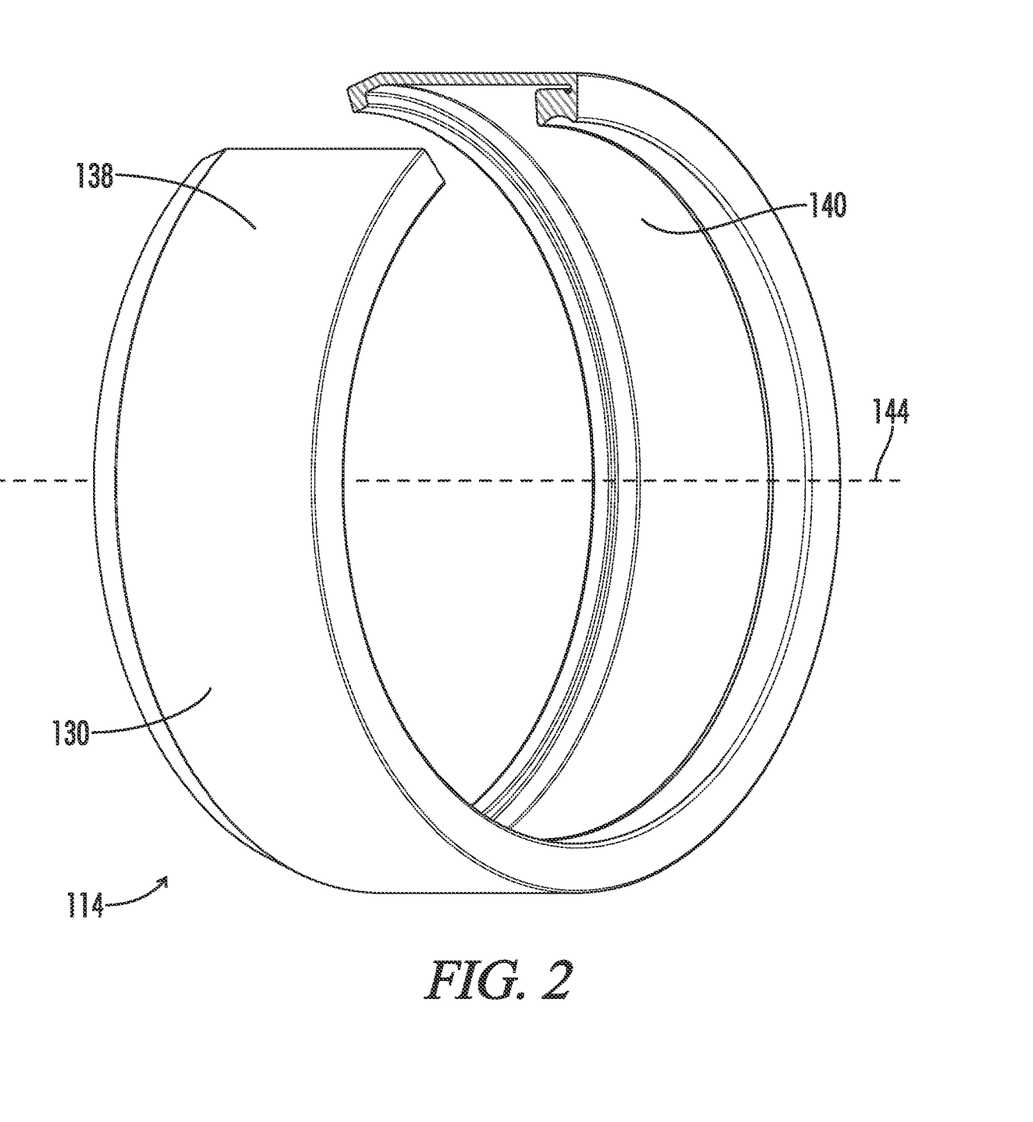
FIG. 2 illustrates an isometric view of a cutaway of the bead clamp ring in a relaxed state.
Figure 3:
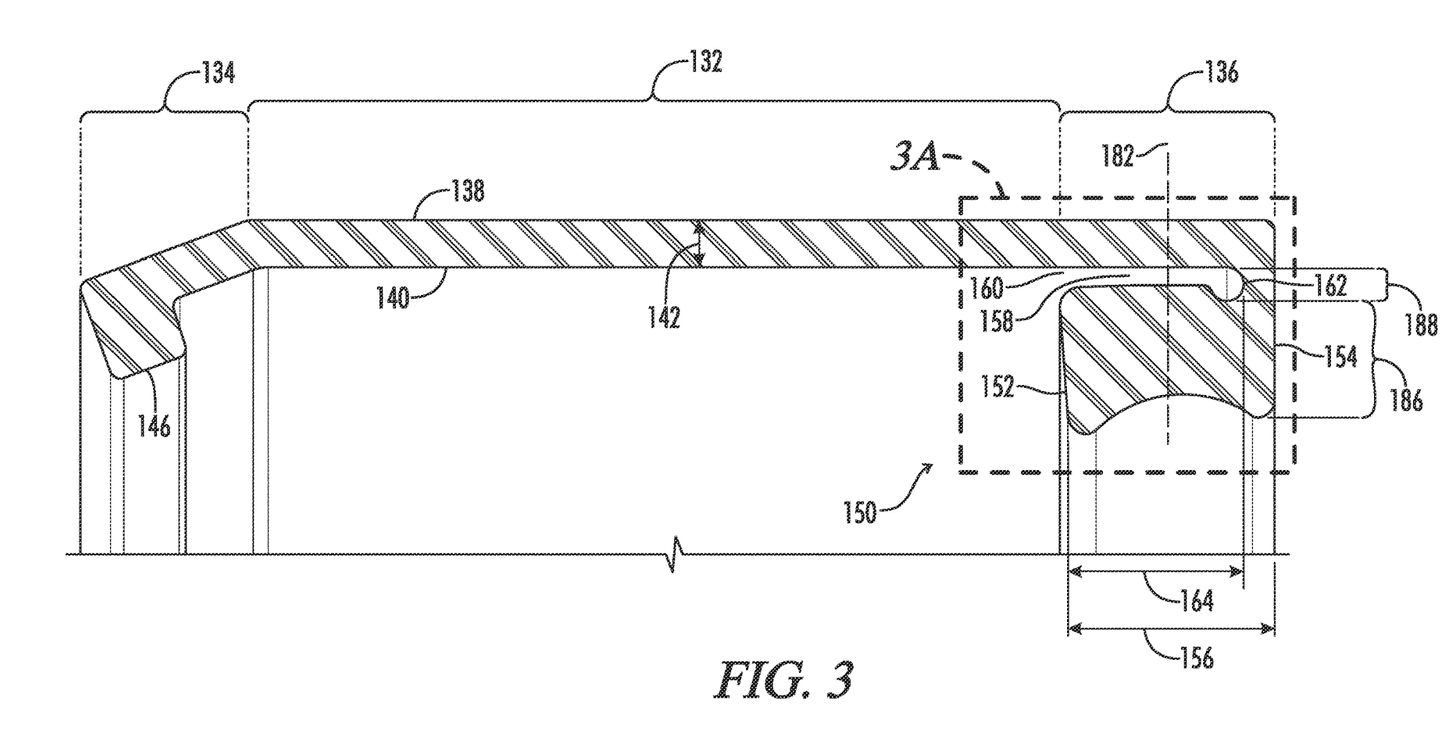
FIG. 3 illustrates a cross sectional view of the bead clamp ring of FIG. 2.

FIG. 2 shows a cutaway view of one embodiment of the bead clamp ring 114 includes an annular body 130 made of a flexible material, such as rubber, that is designed to encircle the tire building drum 102. FIG. 3 shows an embodiment of the cross section view of the bead clamp ring 114 along a cross-section of the bead clamp ring 114 shown in FIG. 2 when the bead clamp ring is in a relaxed, or unstressed, state. In this embodiment, the annular body 130 includes a central body portion 132, a proximal end body portion 134 and a distal end body portion 136. The annular body 130—including the central body portion 132, the proximal end body portion 134, and the distal end body portion 136—is substantially cylindrically tubular in shape such that the outer tubular surface 138 is substantially cylindrical. The central body portion 132 may further have an inner tubular surface 140 that is substantially cylindrical. The distance between the inner tubular surface 140 and the outer tubular surface 138 defines a tubular wall thickness 142. The annular body 130 includes a central axis 144 passing through the center of the substantially cylindrically tubular shape, which defines a longitudinal direction extending parallel to the central axis 144 and a radial direction extending perpendicular from the central axis 144.

The proximal end body portion 134 includes a securing lug 146 defined integrally on the proximal end body portion 134. The securing lug 146 is configured to secure the bead clamp ring 114 to the tire building drum 102 such that when the bead clamp 112 moves radially, a portion of the bead clamp ring 114 remains secured at the proximal end to the tire building drum 102, as shown in FIGS. 1A-1D.

The distal end body portion 136 includes a bead lug 150 defined integrally on the distal end body portion 136. The bead lug 150 is configured to engage the bead clamp 112 to secure the bead clamp ring 114 at the distal end to the bead clamp 112 such that a portion of the bead clamp ring 114 moves with the bead clamp 112 as the bead clamp 112 moves radially. The bead lug 150 extends radially inward from the distal end body portion 136. The bead lug 150 has a proximal end 152 and a distal end 154, the longitudinal distance between the two ends forms a bead lug length 156.

The bead lug 150 further includes an annular recess 158 that extends longitudinally. The recess 158 includes an open end 160 and a closed end 162, and the recess 158 extends between the two ends 160, 162 to form a recess length 164.

In some embodiments, the recess length 164 may extend between 70% and 90% of the bead lug length 156. The recess 158 includes a proximal recess portion 166 having length 168 and an enlarged distal portion 170 having length 172.

The proximal recess portion 166 is the portion of the recess 158 extending from the recess's open end 160 toward the closed end 162. The proximal recess portion 166 has a radial depth 174 defined between a radially outer recess wall 176 and a radially inner recess wall 178. In some embodiments, such as the one shown in FIGS. 3 and 3A, a cross section of the bead clamp ring 114 includes the radially outer recess wall 176 and radially inner recess wall 178 in the proximal recess portion 166 being substantially straight. For example, the radially outer recess wall 176 in some embodiments is an unbroken extension of the inner tubular surface 140 of the central body portion 132.

Figure 3A:
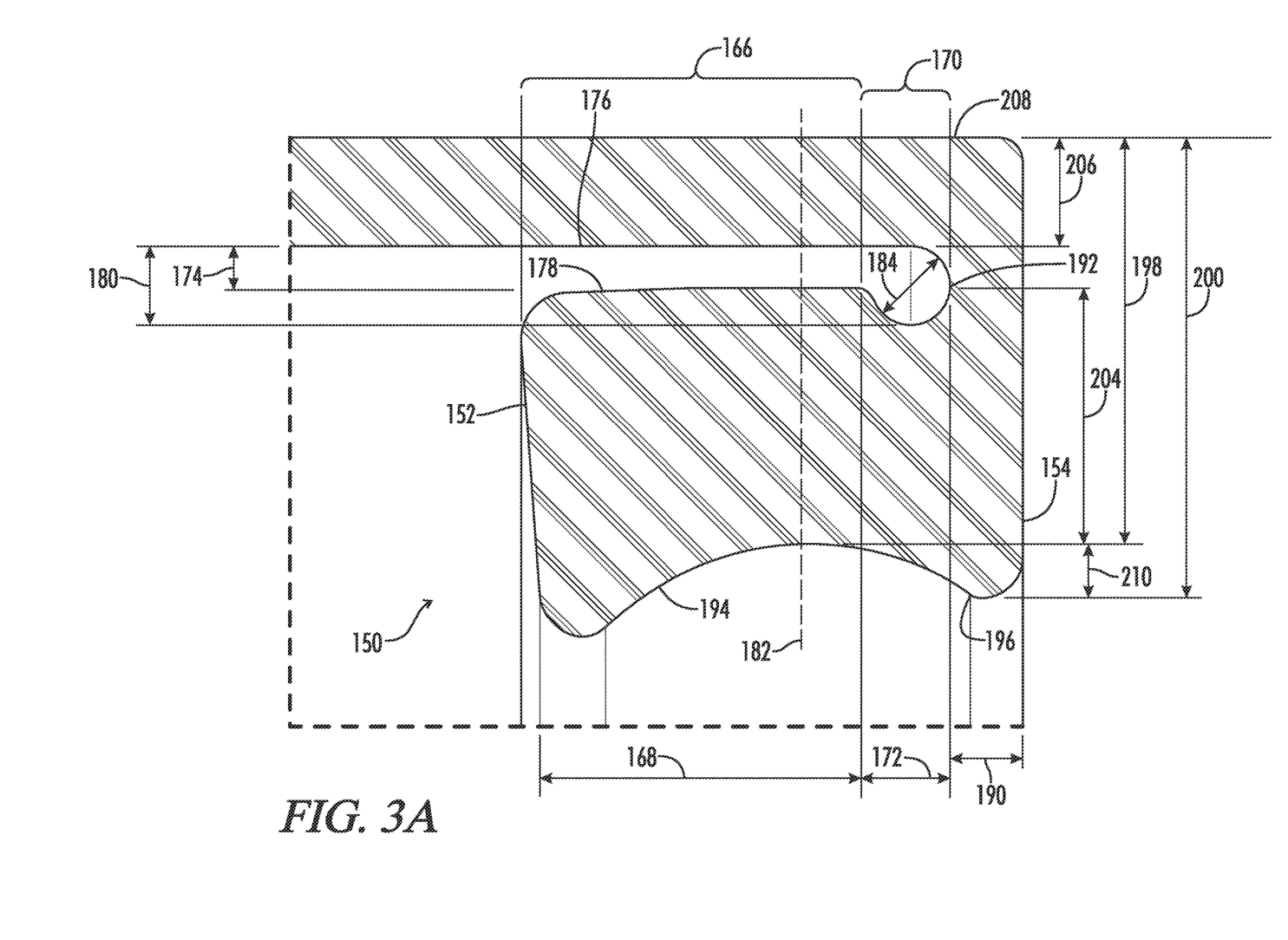
FIG. 3A illustrates an enlarged view of the bead lug of FIG. 3.

The enlarged distal portion 170 is the portion of the recess 158 that defines the closed end 162. The enlarged distal portion 170 extends radially inward below the radially inner recess wall 178 and has a greater radial depth 180 than the proximal recess portion radial depth 174. The enlarged distal portion 170 is located entirely distally of a mid-point 182 of the bead lug length 156. As shown in FIGS. 3 and 3A, some embodiments of the cross-section of the enlarged distal portion 170 may have a generally circular shape. Other embodiments of the cross-section of the enlarged distal portion 170 may be a different shape such as an oval or any other shape that may occur to a skilled artisan. In some embodiments, the radial depth 180 of the enlarged distal portion 170 is at least about 1.5 times or more larger than the radial depth 174 of the proximal recess portion 166 at the point immediately adjacent the enlarged distal portion 170. For example, in embodiments using a circular or partially circular enlarged distal portion 170, the diameter 184 of the enlarged distal portion 170 is at least about 1.5 times the radial depth 174 of the proximal recess portion 166. In a further example, the diameter 184 of the enlarged distal portion 170 may be 2.0 times or more larger than the radial depth 174 of the proximal recess portion 166 or greater.

The bead lug 150, as shown in the cross-section view of FIGS. 3 and 3A, further includes an annular bead lug portion 186 and an annular hinge column 188 defined longitudinally between the recess 158 closed end 162 and the distal end 154 of the bead lug 150. It can be further seen from this configuration that the enlarged distal portion 170 is adjacent to the hinge column 188. The hinge column 188 has a width 190 defined longitudinally between the closed end 162 and the distal end 154 of the bead lug 150. In some embodiments, the hinge column 188 width 190 is less than the tubular wall thickness 142. For example, in some embodiments, the hinge column 188 width 190 may be in the range of from about 50% to about 80% of the tubular wall thickness 142. As a result, in many embodiments, the hinge column 188 is the most flexible part of the bead lug 150 and defines a hinge point 192 of the bead lug 150 with reference to distortion of the bead lug 150 occurring during operation of the tire building machine 100.

This enlarged distal portion 170 allows the bead clamp ring 114 to distribute stress in a way that extends the life of the bead clamp ring 114 compared to prior art bead clamp rings. When the tire bead 106 is placed on the bead clamp ring 114, the tire bead 106 rests on the portion of the bead clamp ring 114 radially outward of the bead lug 150. Typically, the tire bead 106 is more specifically located above the bead lug recess 158, causing the bead lug 150 to bend at the hinge point 192 in the hinge column 188. In the present disclosure, the tire bead 106 will further be located such that it is radially outward of the proximal recess portion 166 rather than being radially outward of the enlarged distal portion 170. It is typical in the tire building process to configure the tire bead 106 as tightly as possible to the bead clamp ring 114 to improve the airtight seal during the tire forming process. As a result, after repeated stress from the tire bead 106, particularly when the bead clamp 112 expands radially, the stress from the tire bead 106 will frequently cause a failure of the bead clamp ring 114 at the point where the distal end body portion 136 meets the hinge column 188. Providing an enlarged distal portion 170 to the recess 158 reduces the stress concentration at this point and allows the bead clamp ring 114 to more evenly redistribute the stress caused by the tire bead 106 as compared to a recess without an enlarged distal portion 170.

In some embodiments, another feature for controlling the distribution of the stress caused by the tire bead 106 involves a concave feature to the bead lug 150, as shown in FIGS. 3 and 3A. In such an embodiment, the cross section of the bead lug 150 may include a radial groove 194 in the radially innermost bead lug surface 196 to create a concave cross-sectional profile for the radially innermost bead lug surface 196. While some prior art bead clamp rings, such as the prior art bead clamp ring shown in FIG. 4, included radial grooves, the radial groove 194 of the present disclosure extends further radially into the bead lug 150 to compensate for the use of a substantially straight proximal recess portion 166. Thus, the increased depth of radial groove 194 allows the bead lug 150 to distribute the compressive stress from the tire bead 106 in a manner similar to the prior art bead clamp ring that relied on the combination of a curved recess and a radial groove to distribute the compressive stress from the tire bead 106. A further benefit of the deeper radial groove 194 of the present disclosure is that it reduces the manufacturing cost of the bead clamp ring 114 by making it unnecessary to include a curve in the proximal portion of the recess 158.

The concave cross-sectional profile creates a radial thickness 198 of the bead lug 150 at a mid-point 182 of the bead lug length that is less than a radial thickness 200 of the bead lug 150 at both the bead lug proximal end 152 and the bead lug distal end 154. In one embodiment, the radial groove 194 is configured such that the radial thickness of the solid material of the bead lug 150 at the mid-point 182 is in a range from about 50% to about 90% of the radial thickness 200 of the bead lug 150 at mid-point 182 at the distal end 154. The radial thickness of the solid material of the bead lug 150 is the radial thickness 204 of the annular bead lug portion 186 from the radially innermost bead lug surface 196 at mid-point 182 to the proximal recess portion radially inner recess wall 178 plus the radial thickness 206 of the bead lug 150 from the proximal recess portion radially outer recess wall 176 to the outermost bead lug surface 208. In another embodiment, the radial groove 194 has a groove depth 210 greater than the radial depth 174 of the proximal recess portion 166.

This written description uses examples to disclose the invention and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although embodiments of the disclosure have been described using specific terms, such description is for illustrative purposes only. The words used are words of description rather than limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. While specific uses for the subject matter of the disclosure have been exemplified, other uses are contemplated. Therefore, the spirit and scope of the appended claims should not be limited to the description of the versions contained herein.

What is claimed is:

1. A bead clamp ring for covering a bead clamp of a tire building drum during a tire building process, comprising:
    an annular body formed of a flexible material, the annular body including a central body portion, a proximal end body portion and a distal end body portion, the annular body including a central axis defining a longitudinal direction extending parallel to the central axis and a radial direction extending perpendicular from the central axis;
    wherein the proximal end body portion includes a securing lug defined integrally on the proximal end body portion, the securing lug being configured to secure the bead clamp ring to the tire building drum;
    wherein the distal end body portion includes a bead lug defined integrally on the distal end body portion, the bead lug being configured to engage the bead clamp, the bead lug extending radially inward relative to the central body portion and having a bead lug length defined in the longitudinal direction between a bead lug proximal end and a bead lug distal end;
    wherein the bead lug includes an annular longitudinally extending recess defined in the bead lug, the recess extending distally from an open recess end formed in the bead lug proximal end to a closed recess end, the recess including a proximal recess portion communicated with the open recess end and an enlarged distal recess portion defining the closed recess end, the proximal recess portion having a proximal recess portion radial depth defined between a proximal recess portion radially outer recess wall and a proximal recess portion radially inner recess wall, and the enlarged distal recess portion extending radially inward below the proximal recess portion radially inner recess wall and having a greater radial depth than the proximal recess portion radial depth, the enlarged distal recess portion being located entirely distally of a mid-point of the bead lug length.

2. The bead clamp ring of claim 1, wherein:
    the recess has a recess length from the open recess end to the closed recess end equal to at least 70% of the bead lug length.

3. The bead clamp ring of claim 1, wherein:
    the recess has a recess length from the open recess end to the closed recess end equal to at least 80% of the bead lug length.

4. The bead clamp ring of claim 1, wherein:
    the recess has a recess length from the open recess end to the closed recess end equal to at least 90% of the bead lug length.

5. The bead clamp ring of claim 1, wherein:
in a cross-sectional view along a radial plane parallel to the central axis the proximal recess portion radially outer recess wall is substantially straight and parallel to the central axis and the enlarged distal recess portion is partially circular in cross-section and extends radially inward below the proximal recess portion radially inner recess wall.

6. The bead clamp ring of claim 5, wherein:
the partially circular cross-section of the enlarged distal recess portion has a diameter at least 1.5 times the proximal recess portion radial depth immediately adjacent the enlarged distal recess portion.

7. The bead clamp ring of claim 5, wherein:
the partially circular cross-section of the enlarged distal recess portion has a diameter at least 2.0 times the proximal recess portion radial depth immediately adjacent the enlarged distal recess portion.

8. The bead clamp ring of claim 5, wherein:
the central body portion of the annular body is substantially cylindrically tubular in shape having a cylindrical outer tubular surface and a cylindrical inner tubular surface, and the proximal recess portion radially outer recess wall is an unbroken extension of the cylindrical inner surface.

9. The bead clamp ring of claim 8, wherein:
the central body portion of the annular body has a tubular wall thickness defined radially between the cylindrical outer tubular surface and the cylindrical inner tubular surface; and
in the cross-sectional view along the radial plane parallel to the central axis the bead lug includes a hinge column defined longitudinally between the closed recess end and the distal end of the bead lug, the hinge column having a hinge column width defined longitudinally between the closed recess end and the distal end of the bead lug, the hinge column width being less than the tubular wall thickness.

10. The bead clamp ring of claim 9, wherein:
the hinge column width is in the range of from about 50% to about 80% of the tubular wall thickness.

11. The bead clamp ring of claim 9, wherein:
the hinge column is a most flexible part of the bead lug and defines a hinge point of the bead lug with reference to distortion of the bead lug occurring during operation of the tire building drum.

12. The bead clamp ring of claim 1, wherein:
in a cross-sectional view along a radial plane parallel to the central axis the bead lug includes a radially innermost bead lug surface including a radially inner bead lug groove having a concave cross-sectional profile such that a radial thickness of the bead lug at a mid-point of the bead lug length is less than a radial thickness of the bead lug at both the bead lug proximal end and the bead lug distal end.

13. The bead clamp ring of claim 12, wherein:
in the cross-sectional view along a radial plane parallel to the central axis, at the mid-point of the bead lug length, the bead lug has a radial solid material thickness equal to a first radial distance from the radially innermost bead lug surface to the proximal recess portion radially inner recess wall plus a second radial distance from the proximal recess portion radially outer recess wall to a radially outermost bead lug surface, the radial solid material thickness being in a range of from about 50% to about 90% of the radial thickness of the bead lug at the bead lug distal end.

14. The bead clamp ring of claim 12, wherein:
in the cross-sectional view along the radial plane parallel to the central axis, at the mid-point of the bead lug length, the radially inner bead lug groove has a groove depth greater than the proximal recess portion radial depth.

15. A tire building machine including the bead clamp ring of claim 1, wherein:
the bead clamp ring surrounds the tire building drum with the bead lug received about the bead clamp.

16. A bead clamp ring for covering a bead clamp of a tire building drum during a tire building process, comprising:
an annular body formed of a flexible material, the annular body including:
a generally cylindrically tubular body portion including a central axis defining a longitudinal direction and radial direction extending perpendicular from the central axis;
an annular securing lug defined integrally on a proximal end of the generally cylindrically tubular body portion, the securing lug being configured to secure the bead clamp ring to the tire building drum;
an annular hinge extending radially inward from a distal end of the generally cylindrically tubular body portion;
an annular bead lug portion located radially inward of the generally cylindrically tubular body portion and connected to the generally cylindrically tubular body portion by the annular hinge, the annular bead lug portion having an annular bead lug length parallel to the central axis; and
wherein in an unstressed state of the annular body an annular recess separates the generally cylindrically tubular body portion from the annular bead lug portion, the recess extending from an open recess proximal end to a closed recess distal end adjacent the annular hinge, the recess having a mid-point recess radial width at a mid-point of the annular bead lug length, and the recess having an enlarged recess portion adjacent the annular hinge, the enlarged recess portion having an enlarged recess portion radial width greater than the mid-point recess radial width.

17. The bead clamp ring of claim 16, wherein:
the annular recess has a recess length from the open recess proximal end to the closed recess distal end equal to at least 80% of the bead lug length.

18. The bead clamp ring of claim 16, wherein:
in a cross-sectional view along a radial plane parallel to the central axis the enlarged recess portion is partially circular in cross-section and has a diameter at least 1.5 times the mid-point recess radial width.

19. The bead clamp ring of claim 16, wherein:
the generally cylindrically tubular body portion has a tubular wall thickness; and
the annular hinge has a minimum hinge dimension parallel to the central axis, the minimum hinge dimension being less than the tubular wall thickness.

20. The bead clamp ring of claim 19, wherein:
the minimum hinge dimension is in the range of from about 50% to about 80% of the tubular wall thickness.

* * * * *